United States Patent
Thompson et al.

(10) Patent No.: US 10,289,447 B1
(45) Date of Patent: May 14, 2019

(54) PARALLEL PROCESS SCHEDULING FOR EFFICIENT DATA ACCESS

(71) Applicant: SAS Institute Inc., Cary, NC (US)

(72) Inventors: William Clayton Thompson, Raleigh, NC (US); Yiu-Fai Yung, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 16/221,752

(22) Filed: Dec. 17, 2018

Related U.S. Application Data (60) Provisional application No. 62/670,468, filed on May 11, 2018.

(51) Int. Cl.
*G06F 9/30* (2018.01)
*G06F 9/38* (2018.01)
*G06F 9/48* (2006.01)
*G06F 9/50* (2006.01)
*G06F 9/52* (2006.01)
*G06K 9/62* (2006.01)

(52) U.S. Cl.
CPC .......... *G06F 9/4881* (2013.01); *G06F 9/3009* (2013.01); *G06F 9/3851* (2013.01); *G06F 9/3889* (2013.01); *G06F 9/5038* (2013.01); *G06F 9/5066* (2013.01); *G06F 9/52* (2013.01); *G06K 9/6247* (2013.01)

(58) Field of Classification Search
CPC .................................................. G06F 9/4881
See application file for complete search history.

(56) References Cited

PUBLICATIONS

Clarkson, Douglas, Quartic Rotation Criteria and Algorithms, Psychometrika, vol. 53, No. 2, Jun. 1988, pp. 251-259 (Year: 1988) as IDS attached.*
SAS Institute, SAS Visual Data Mining and Machine Learning 8.1 Data Mining and Machine Learning Procedures, SAS Institute Inc, Mar. 2017, pp. 329 pages (Year: 2017) as IDS attached.*
Clarkson, Douglas, Quartic Rotation Criteria and Algorithms, Psychometrika, vol. 53, No. 2, Jun. 1988, pp. 251-259.
SAS Institute, SAS Visual Data Mining and Machine Learning 8.1 Data Mining and Machine Learning Procedures, SAS Institute Inc, Mar. 2017, pp. 329 pages.

(Continued)

*Primary Examiner* — Sisley N Kim
(74) *Attorney, Agent, or Firm* — Bell & Manning, LLC (57) ABSTRACT

A computing device schedules and processes a plurality of optimization tasks in parallel by creating a scheduling table. A group size is a number of factor variables divided by two. A set of variable pairs is assigned to each group of a plurality of groups. The group size defines a number of variable pairs included in each set of variable pairs. Each unique pair of unordered factor variables is assigned to a single set of variable pairs of the groups. Each set of variable pairs includes each factor variable once. A scheduling table is created for a plurality of iterations by consecutively assigning each pair of variables from the set of variable pairs assigned to each group of the groups based on a number of threads. A pair of variables is assigned to a thread of the plurality of threads to execute the optimization until each pair is assigned once.

30 Claims, 6 Drawing Sheets

(56) References Cited

PUBLICATIONS

Abrudan et al, Steepest Descent Algorithms for Optimization Under Unitary Matrix Constraint, IEEE Transactions on Signal Processing, vol. 56, No. 3, Mar. 2008, pp. 1134-1147.

Richtarik et al., Parallel coordinate descent methods for big data optimization, Math. Program., Ser. A (2016) 156, 2016, pp. 433-484.

Wright, Stephen J., Coordinate Descent Algorithms, Optimization Online, 2015, pp. 1032.

Jiang et al, A Framework of Constraint Preserving Update Schemes for Optimization on Stiefel Manifold, arXiv:1301.0172v3, Sep. 19, 2014, pp. 1-29.

A feasible method for optimization with orthogonality constraints, Mathematical Programming, vol. 142, Issue 1-2, Dec. 2013, pp. 397-434.

Shalit et al., Efficient coordinate-descent for orthogonal matrices through Givens rotations, arXiv:1312.0624v2, Dec. 13, 2013, pp. 1-15.

Schmidt et al., Projected Newton-type Methods in Machine Learning, 2013, pp. 297-321.

Suksomong, Warut, Scheduling Asynchronous Round-Robin Tournaments, Operations Research Letters, vol. 44, Issue 1, Jan. 2016, pp. 96-100.

Nishimori et al., Learning algorithms utilizing quasi-geodesic flows on the Stiefel manifold, Neurocomputing 67, Jun. 20, 2005, pp. 106-135.

Jennrich, Robert et al., Gradient Projection Algorithms and Software for Arbitrary Rotation Criteria in Factor Analysis, Educational and Psychological Measurement, vol. 65, No. 5, Oct. 2005, pp. 676-696.

Trick, Michael, Scheduling Court-Constrained Sports Tournaments, Patatconference proceedings, 2004, pp. 1-6.

Jennrich, Robert, A Simple General Procedure for Orthogonal Rotation, Psychometrika, vol. 66, No. 2, Jun. 2001, pp. 289-306.

Edelman et al, The Geometry of Algorithms With Orthogonality Constraints, Siam J. Matrix Anal Appl., vol. 20, No. 2, 1998, pp. 303-353.

\* cited by examiner

PARALLEL PROCESS SCHEDULING FOR EFFICIENT DATA ACCESS

CROSS-REFERENCE TO RELATED APPLICATIONS

The present application claims the benefit of 35 U.S.C. § 119(e) to U.S. Provisional Patent Application No. 62/670,468 filed on May 11, 2018, the entire contents of which are hereby incorporated by reference.

SUMMARY

In an example embodiment, a non-transitory computer-readable medium is provided having stored thereon computer-readable instructions that, when executed by a computing device, cause the computing device to schedule and process a plurality of optimization tasks in parallel. A group size is defined as a number of factor variables divided by two. The number of factor variables is increased by one when the number of factor variables is an odd number. A set of variable pairs is assigned to each group of a plurality of groups. The defined group size defines a number of variable pairs included in each set of variable pairs. Each unique pair of unordered factor variables is assigned to a single set of variable pairs of the plurality of groups. Each set of variable pairs includes each factor variable once. A scheduling table is created for a plurality of iterations by consecutively assigning each pair of variables from the set of variable pairs assigned to each group of the plurality of groups based on a number of threads of a plurality of threads. A pair of variables is assigned to a thread of the plurality of threads until each pair is assigned once. (a) The set of variable pairs for a first iteration is selected from a first row of the created scheduling table. (b) Each variable pair of the selected set of variable pairs is assigned to a thread of the plurality of threads, wherein each thread executes a predefined optimization function using a respective assigned variable pair. (c) Optimization function results are received from each thread of the plurality of threads. The optimization function results are output from the predefined optimization function executed by a respective thread. (d) Combined optimization function results are updated with the optimization function results received from each thread of the plurality of threads. (e) (a) to (d) are repeated with each remaining iteration of the plurality of iterations as the first iteration, wherein the first row is a next row of the created scheduling table. (a) to (e) are repeated until the combined optimization function results satisfy a convergence criterion. The combined optimization function results are output.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to schedule and process a plurality of optimization tasks in parallel.

In yet another example embodiment, a method of scheduling and processing a plurality of optimization tasks in parallel is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
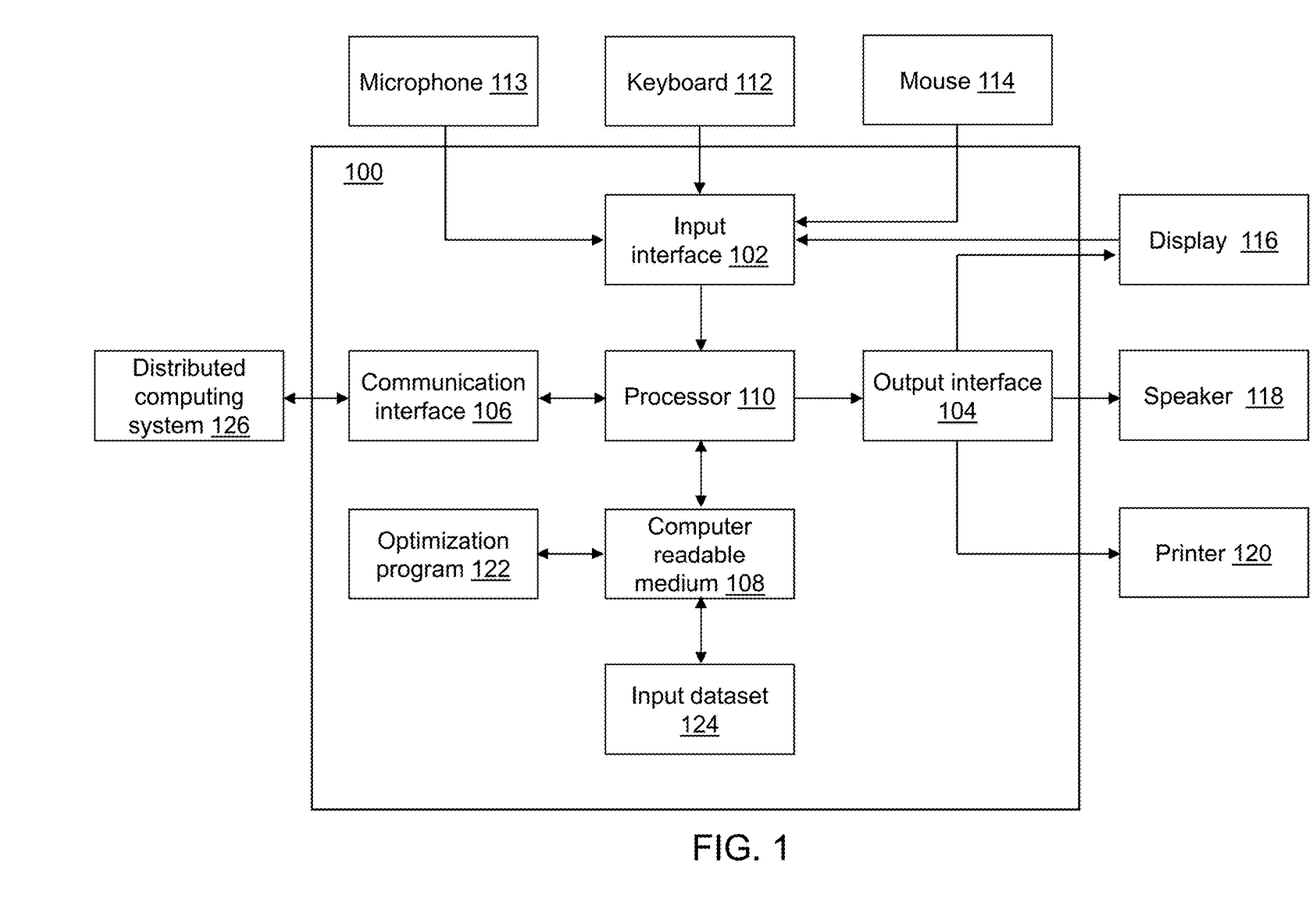
FIG. 1 depicts a block diagram of an optimization device in accordance with an illustrative embodiment.

Referring to FIG. 1, a block diagram of an optimization device 100 is shown in accordance with an illustrative embodiment. Optimization device 100 may include an input interface 102, an output interface 104, a communication interface 106, a non-transitory computer-readable medium 108, a processor 110, an optimization program 122, and a input dataset 124. Fewer, different, and/or additional components may be incorporated into optimization device 100. Optimization program 122 executes an optimization function on a dataset using a plurality of threads. Optimization program 122 assigns optimization computations to each thread to avoid resource conflicts while fully utilizing the available threads to reduce the execution time resulting in a technical improvement to a basic computing function in the technical area of analytic modeling.

Input interface 102 provides an interface for receiving information from the user or another device for entry into optimization device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into optimization device 100 or to make selections presented in a user interface displayed on display 116.

The same interface may support both input interface 102 and output interface 104. For example, display 116 comprising a touch screen provides a mechanism for user input and for presentation of output to the user. Optimization device 100 may have one or more input interfaces that use the same or a different input interface technology. The input interface technology further may be accessible by optimization device 100 through communication interface 106.

Output interface 104 provides an interface for outputting information for review by a user of optimization device 100 and/or for use by another application or device. For example, output interface 104 may interface with various output technologies including, but not limited to, display 116, a speaker 118, a printer 120, etc. Optimization device 100 may have one or more output interfaces that use the same or a different output interface technology. The output interface technology further may be accessible by optimization device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Optimization device 100 may have one or more communication interfaces that use the same or a different communication interface technology. For example, optimization device 100 may support communication using an Ethernet port, a Bluetooth antenna, a telephone jack, a USB port, etc. Data and messages may be transferred between optimization device 100 and another computing device of distributed computing system 126 using communication interface 106.

Non-transitory computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Optimization device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Optimization device 100 also may have one or more drives that support the loading of a memory media such as a CD, DVD, an external hard drive, etc. One or more external hard drives further may be connected to optimization device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Optimization device 100 may include a plurality of processors that use the same or a different processing technology.

Some processors may be central processing units (CPUs). Some processes may be more efficiently and speedily executed and processed with machine-learning specific processors (e.g., not a generic CPU). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency response variables and improvements throughout various parts of the system.

Optimization program 122 performs operations associated with performing an optimization task using a plurality of threads. Some or all of the operations described herein may be embodied in optimization program 122. The operations may be implemented using hardware, firmware, software, or any combination of these methods.

Referring to the example embodiment of FIG. 1, optimization program 122 is implemented in software (comprised of computer-readable and/or computer-executable instructions) stored in computer-readable medium 108 and accessible by processor 110 for execution of the instructions that embody the operations of optimization program 122. Optimization program 122 may be written using one or more programming languages, assembly languages, scripting languages, etc. Optimization program 122 may be integrated with other analytic tools. As an example, optimization program 122 may be part of an integrated data analytics software application and/or software architecture such as that offered by SAS Institute Inc. of Cary, N.C., USA. Merely for illustration, optimization program 122 may be implemented using or integrated with one or more SAS software tools such as Base SAS, SAS® Enterprise Miner™, SAS/STAT®, SAS® High Performance Analytics Server, SAS® Visual Data Mining and Machine Learning, SAS® LASR™, SAS® Viya™, SAS In-Memory Statistics for Hadoop®, all of which are developed and provided by SAS Institute Inc. of Cary, N.C., USA. Data mining, statistical analytics, and response prediction are used in a wide variety of industries to solve technical problems.

Optimization program 122 may be implemented as a Web application. For example, optimization program 122 may be configured to receive hypertext transport protocol (HTTP) responses and to send HTTP requests. The HTTP responses may include web pages such as hypertext markup language documents and linked objects generated in response to the HTTP requests. Each web page may be identified by a uniform resource locator that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language file, or any other type of file supported by HTTP.

Input dataset 124 may include, for example, a plurality of rows and a plurality of columns. The plurality of rows may be referred to as observation vectors or records (observations), and the columns may be referred to as variables. In an alternative embodiment, input dataset 124 may be transposed. An observation vector is defined as $x_i$ that may include a value for each of the plurality of variables associated with the observation i. Each variable of the plurality of variables may describe a characteristic of a physical object. For example, if input dataset 124 includes data related to operation of a vehicle, the variables may include an oil pressure, a speed, a gear indicator, a gas tank level, a tire pressure for each tire, an engine temperature, a radiator level, etc. Input dataset 124 may include data captured as a function of time for one or more physical objects.

The data stored in input dataset 124 may be generated by and/or captured from a variety of sources including one or more sensors of the same or different type, one or more computing devices, etc. The data stored in input dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. The data stored in input dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

In data science, engineering, and statistical applications, data often consists of multiple measurements (across sensors, characteristics, responses, etc.) collected across multiple time instances (patients, test subjects, etc.). These measurements may be collected in input dataset 124 for analysis and processing to be performed using an analytic model that may itself be defined using a programming language integrated with optimization program 122.

Input dataset 124 may be stored on computer-readable medium 108 and/or on one or more computer-readable media of distributed computing system 126 and accessed by optimization device 100 using communication interface 106, input interface 102, and/or output interface 104. Data stored in input dataset 124 may be sensor measurements or signal values captured by a sensor, may be generated or captured in response to occurrence of an event or a transaction, generated by a device such as in response to an interaction by a user with the device, etc. The data stored in input dataset 124 may be captured at different time points periodically, intermittently, when an event occurs, etc. One or more columns of input dataset 124 may include a time and/or date value.

Input dataset 124 may include data captured under normal operating conditions of the physical object. Input dataset 124 may include data captured at a high data rate such as 200 or more observation vectors per second for one or more physical objects. For example, data stored in input dataset 124 may be generated as part of the Internet of Things (IoT), where things (e.g., machines, devices, phones, sensors) can be connected to networks and the data from these things collected and processed within the things and/or external to the things before being stored in input dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input dataset 124.

Input dataset 124 may be stored using various data structures as known to those skilled in the art including one or more files of a file system, a relational database, one or more tables of a system of tables, a structured query language database, etc. Optimization device 100 may coordinate access to input dataset 124 that is distributed across distributed computing system 126 that may include one or more computing devices. For example, input dataset 124 may be stored in a cube distributed across a grid of computers as understood by a person of skill in the art. As another example, input dataset 124 may be stored in a multi-node Hadoop® cluster. For instance, Apache™ Hadoop® is an open-source software framework for distributed computing supported by the Apache Software Foundation. As another example, input dataset 124 may be stored in a cloud of computers and accessed using cloud computing technologies, as understood by a person of skill in the art. The SAS® LASR™ Analytic Server may be used as an analytic platform to enable multiple users to concurrently access data stored in input dataset 124. The SASS Viya™ open, cloud-ready, in-memory architecture also may be used as an analytic platform to enable multiple users to concurrently access data stored in input dataset 124. SAS® Cloud Analytic Services (CAS) may be used as an analytic server with associated cloud services in SAS® Viya™. Some systems may use SAS In-Memory Statistics for Hadoop® to read big data once and analyze it several times by persisting it in-memory for the entire session. Some systems may be of other types and configurations.

Factor analysis explains the observed correlations among a relatively large set of variables in terms of a smaller set of common factors. Common factors are unobserved constructs that partially explain observed variation in two or more variables. After the number of common factors has been determined, a factor solution provides an initial factor pattern matrix that shows correlations between variables and common factors. However, because the common factors are unobserved constructs, this initial factor pattern defines the common factor space in an arbitrarily chosen system of axes. To interpret common factors meaningfully, factor rotation transforms the initial solution so that the pattern matrix has "simple structures," which means that most elements in the matrix are close to zero after rotation. This makes the factor pattern easier to interpret. Therefore, factor rotation is critical to the understanding of a factor solution.

Of the various methods for factor rotation, planar rotation has proven the most popular due to its simplicity in implementation. Planar rotation considers a pair of factors at a time and transforms the corresponding plane. It repeats the transformation for all pairs of factors to complete a cycle. Repeating the cycles leads to a simple structure factor solution. However, when the number of variables (and/or factors) is large, the rotation process is very time-consuming. The computational performance can be improved substantially by multithreaded or parallel computation. Yet, to take advantage of parallel computations, careful coordination of the planar rotation subtasks is required to avoid data and resource conflicts. Optimization program 122 provides an efficient parallel algorithm for planar factor rotation and oblique rotation, which allows multithreaded or parallel computation to improve performance. Though always important, improving performance is particularly important in machine learning and artificial intelligence where performance is critical (edge analytics, event stream processing, online learning, etc.).

Figure 2:
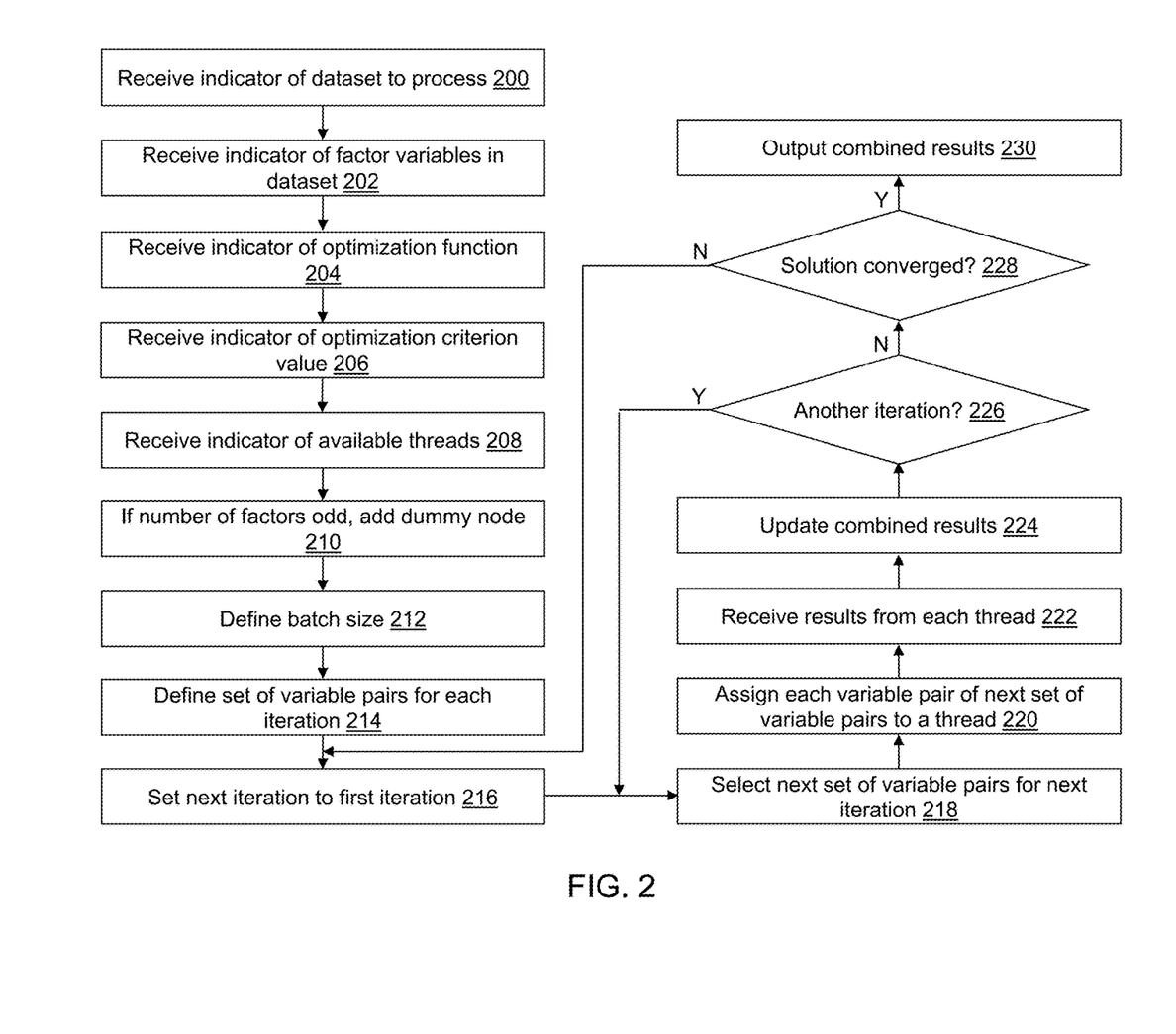
FIG. 2 depicts a flow diagram illustrating examples of operations performed by the optimization device of FIG. 1 in accordance with an illustrative embodiment.

Referring to FIG. 2, example operations associated with optimization program 122 are described. Optimization program 122 may be executed directly by the user or may be called by another application such as an analytic computation application with a request to solve an optimization problem. Additional, fewer, or different operations may be performed depending on the embodiment of optimization program 122. The order of presentation of the operations of FIG. 2 is not intended to be limiting. Some of the operations may not be performed in some embodiments. Although some of the operational flows are presented in sequence, the various operations may be performed in various repetitions, concurrently (in parallel, for example, using threads and/or distributed computing system 126), and/or in other orders than those that are illustrated. For example, a user may execute optimization program 122, which causes presentation of a first user interface window, which may include a plurality of menus and selectors such as drop-down menus, buttons, text boxes, hyperlinks, etc. associated with optimization program 122 as understood by a person of skill in the art. The plurality of menus and selectors may be accessed in various orders. An indicator may indicate one or more user selections from a user interface, one or more data entries into a data field of the user interface, one or more data items read from computer-readable medium 108, one or more data items received through communication interface 106 from another computing device of distributed computing system 126, or otherwise defined with one or more default values, etc. that are received as an input by optimization program 122. In an illustrative embodiment, optimization program 122 may be integrated with a program complier or interpreter to automatically generate derivative program code to accomplish a derivative computation based on provided inputs.

In an operation 200, a first indicator may be received that indicates input dataset 124. For example, the first indicator indicates a location and a name of input dataset 124. As an example, the first indicator may be received by optimization program 122 after selection from a user interface window or after entry by a user into a user interface window. In an alternative embodiment, input dataset 124 may not be selectable. For example, a most recently created dataset may be used automatically. Input dataset 124 includes a number of observation vectors N.

In an operation 202, a second indicator may be received that indicates a plurality of variables of input dataset 124 to evaluate as factor variables. For example, the second indicator may indicate a plurality of column numbers or a plurality of column names. As another option, all of the columns may be used by default. Each observation vector $x_i$, $i=1, \ldots, N$ read from input dataset 124 may include a value for each variable of the plurality of variables to evaluate as factor variables to define m dimensions or factors and defines a set of observation vectors $$X=[x_1, x_2, \ldots, x_N], \text{ where } x_i=[v_{i1}, v_{i2}, \ldots, v_{im}],$$
$$i=1, \ldots, N.$$

Figure 4A:
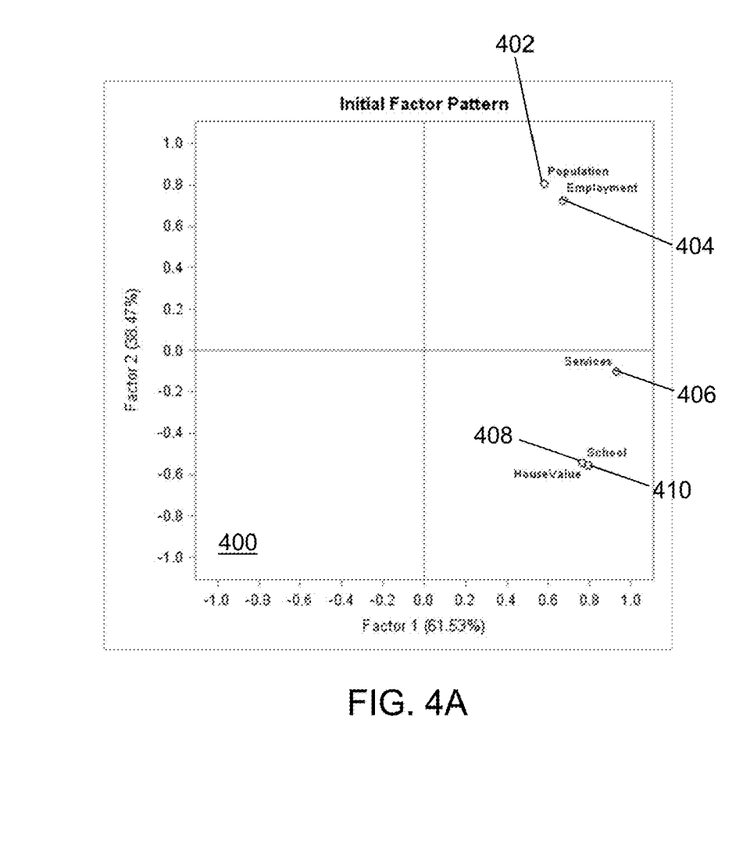
FIG. 4A depicts an initial factor pattern graph in accordance with an illustrative embodiment.
Figure 4B:
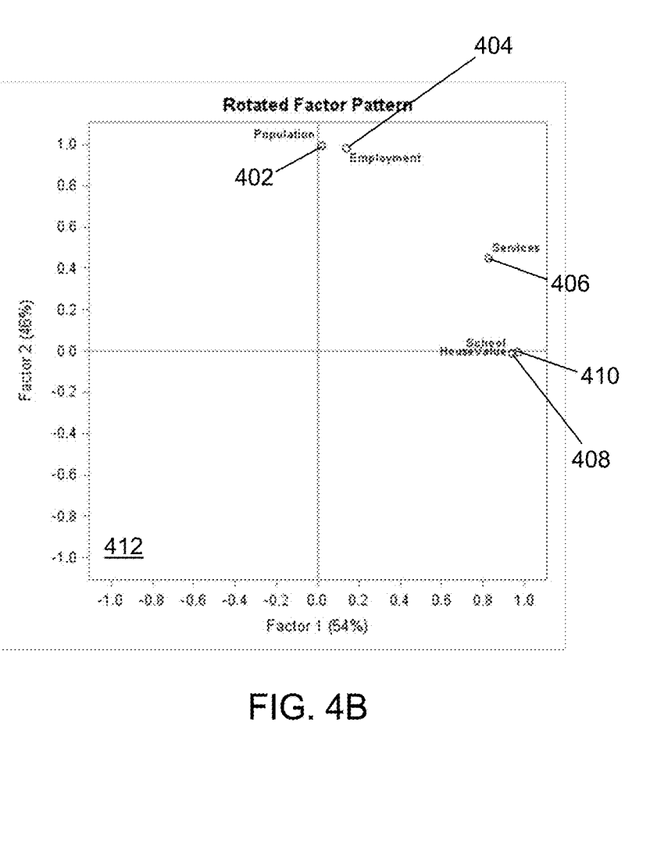
FIG. 4B depicts a first rotated factor pattern graph in accordance with an illustrative embodiment.

In an operation 204, a third indicator may be received that indicates an optimization function. The optimization function includes an operation on a pairs of factor variables. For illustration, the operation may be an orthogonal rotation of pair of variables or an oblique rotation of the pair of variables. For example, a factor analysis optimization function includes either an orthogonal or an oblique rotation between pairs of factor variables each iteration. For illustration, FIG. 4A shows an initial graph 400 of five factor variables: a first factor variable 402, a second factor variable 404, a third factor variable 406, a fourth factor variable 408, and a fifth factor variable 410. For illustration, FIG. 4B shows a rotated graph 412 of the same five factor variables.

As an example, the optimization function may be selected from "Factor analysis", "Cluster", "PCA", "Canonical Correlation", "Robust PCA". The optimization function may be labeled or selected in a variety of different manners by the user as understood by a person of skill in the art. In an alternative embodiment, the optimization function may not be selectable, and a single optimization function is implemented in optimization program 122. For illustration, "Factor analysis" indicates a factor analysis. For illustration, "Factor analysis" indicates a factor analysis. For illustration, "Cluster" indicates a clustering analysis. For illustration, "Canonical Correlation" indicates a canonical correlation analysis. For illustration, "Robust PCA" indicates a robust PCA. For illustration, a FACTOR procedure performs factor analysis using SAS/STAT, a VARCLUS procedure performs clustering using SAS/STAT, a MWPCA procedure performs principal component analysis using SAS Visual Data Mining and Machine Learning, an RPCA procedure performs robust PCA using SAS Viya, a HPPRINCOMP procedure performs PCA using SAS High-Performance Procedures, a PRINCOMP procedure performs PCA using SAS/STAT, a CANCORR procedure performs canonical correlation analysis using SAS/STAT, etc. The optimization function may include rotation-like optimizations provided that the optimization criterion is invariant to permutations of the columns of input dataset 124. The class of "rotation-like" optimizations include constrained optimization problems in which the constraint space is the Steifel or Grassmann manifold as understood by a person of skill in the art.

In an operation 206, a fourth indicator of an optimization criterion value may be received. The optimization criterion value may include a plurality of criteria values. In an alternative embodiment, the fourth indicator may not be received. For example, a default value(s) may be stored, for example, in computer-readable medium 108 and used automatically. In another alternative embodiment, the optimization criterion value(s) may not be selectable. Instead, a fixed, predefined value(s) may be used. For illustration, the optimization criterion may include a maximum number of iterations, a convergence tolerance value, etc.

In an operation 208, a fifth indicator of number of available threads T may be received. In an alternative embodiment, the fifth indicator may not be received. For example, a default value(s) may be stored, for example, in computer-readable medium 108 and used automatically. In another alternative embodiment, the fifth may not be selectable. Instead, a fixed, predefined value(s) may be used. A single-machine mode is a computing model in which multiple processors or multiple cores are controlled by a single operating system and can access shared resources such as disks and memory. Single-machine mode refers to an application running multiple concurrent threads on a multi-core machine to take advantage of parallel execution on multiple processing units. The number of CPUs (cores) on the computing device may be used to determine the number of available threads. For example, one thread per core may be used though other values may be specified using the fifth indicator.

In an operation 210, a number of factors m of the plurality of variables to evaluate as factor variables is odd, add a dummy node d=m+1. Otherwise, d=m, where d defines a number of nodes of a graph.

In an operation 212, a group size k in which there are no resource conflicts is defined based on the number of nodes of the graph as k=d/2.

Figure 5A:
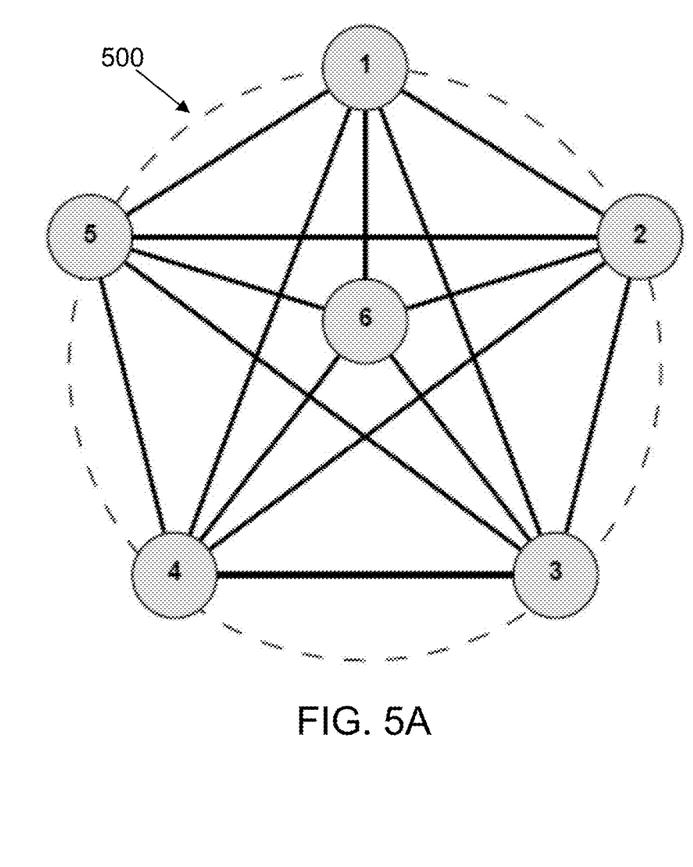
FIG. 5A depicts a complete undirected graph of six nodes in accordance with an illustrative embodiment.
Figure 5B:
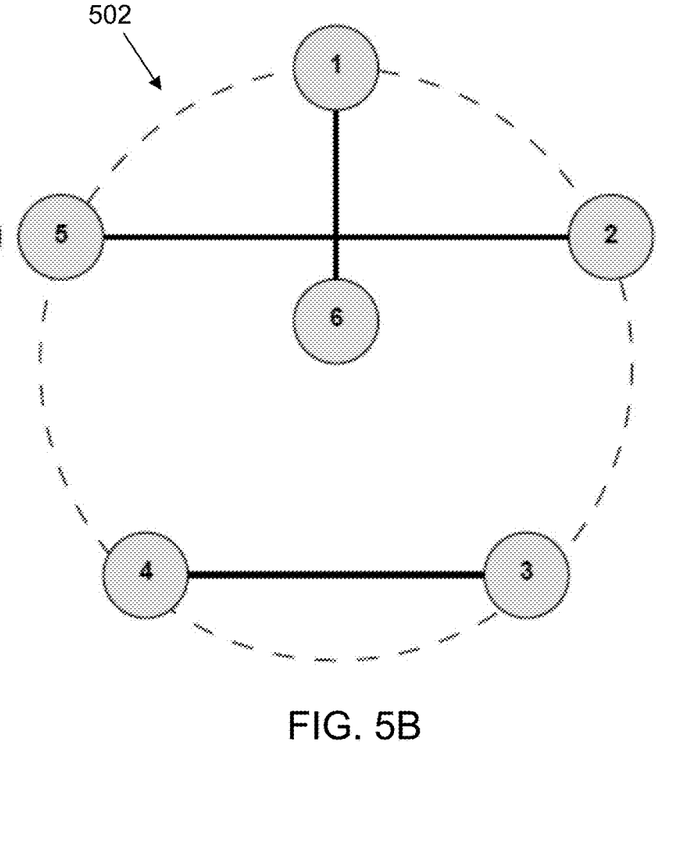
FIG. 5B depicts a first 1-factor graph selected from the complete undirected graph of FIG. 5A in accordance with an illustrative embodiment.

In an operation 214, a set of variable pairs is defined for each group of the $N_b$ number of groups, where $N_b$=2k−1. Each set of variable pairs defines a 1-factor for the associated group number of a complete undirected graph defined for each node of the number of nodes of the graph d. Each node represents either the dummy node, if any, or a factor variable of the plurality of variables to evaluate as factor variables. A pairing of two variables that are each associated with a column of input dataset 124 is represented by an edge connecting two nodes. The set of all possible pairs of variables is represented by the complete graph. For illustration, FIG. 5A shows a complete undirected graph 500 for six variables indicated as "1", "2", "3", "5", and "6". A subset of the edges can be identified so that each node in the graph is incident to exactly one edge. This is defined as a 1-factor of a graph. The edges of a 1-factor correspond to a set of computations of the optimization function on a pair of variables, such as an orthogonal rotation, that can be computed simultaneously without any risk of resource conflict. For illustration, FIG. 5B shows a 1-factor for a first group in accordance with an illustrative embodiment.

The first 1-factor is computed using $(2k, 1)_1$, $(2, 2k-1)_2$, $(3, 2k-2)_3$, ..., $(k, k+1)_k$, where a number of the pairs included in each set of variable pairs is k, and where each ( ) indicates a pair of variables (y,z) with y being a first index to a first variable of the d defined number of nodes of the graph and z being a second index to a second variable of the d defined number of nodes of the graph. For illustration, using graph 500 with six variables and assuming T≥3 such that k=3, the first 1-factor and the first set of variable pairs for the first group is (6, 1), (2, 5), (3, 4), again where a number of the pairs included in each set of variable pairs is k.

There may be another index used to denote the actual column of input dataset 124 that is associated with the node. For example, node 1 may be associated with a first column of input dataset 124, node 2 may be associated with a third column of input dataset 124, node 3 may be associated with a fifth column of input dataset 124, etc. based on the second indicator. For simplicity in the examples, node 1 is associated with a first variable and a first column of input dataset 124, node 2 is associated with a second variable and a second column of input dataset 124, node 3 is associated with a third variable and a third column of input dataset 124 based on the second indicator, etc.

A next 1-factor is computed by replacing 2k−1 with the value zero and adding the value one to each index of the first set of variable pairs except for the index equal to 2k. For illustration, using graph 500 with six variables and assuming T≥3 and k=3, the $N_b$ (2*3−1=5) sets of variable pairs are (6, 1), (2, 5), (3, 4)—group 1
(6, 2), (3, 1), (4, 5)—group 2
(6, 3), (4, 2), (5, 1)—group 3
(6, 4), (5, 3), (1, 2)—group 4
(6, 5), (1, 4), (2, 3)—group 5

When a dummy node was added, for example, when d≠m, each variable pair that includes the index equal to d may be deleted from the associated set of variable pairs. For example, if graph 500 actually included five variables instead of six, only two threads would be used and the set of variable pairs for each group would be:

(2, 5), (3, 4)—group 1
(3, 1), (4, 5)—group 2
(4, 2), (5, 1)—group 3
(5, 3), (1, 2)—group 4
(1, 4), (2, 3)—group 5

Each row in the table above represents a group of operations on pairs of factor variables that can be computed simultaneously by parallel processing threads. If the pairs are enumerated in reading order (left to right, then top to bottom), a node cannot appear twice in any consecutive (k−1) pairing. When the number of available threads T is greater than or equal to the group size T≥k, the number of threads $T_B$ used to process each iteration is set equal to $T_B$=k to avoid a resource conflict. When the number of available threads T is less than the group size, the threads are assigned a variable pair in reading order. There is no risk of a resource conflict even when a group of size k contains pairs from two rows because no column is repeated in any consecutive (k−1) pairing.

A scheduling table defines a pair assignment to each thread as the sets of variable pairs are processed. For illustration, using graph 500 with six variables and assuming T≥3 and k=3, the $N_b$ (2*3−1=5) sets of variable pairs are

| Set iteration Number | Thread 1 | Thread 2 | Thread 3 |
|---|---|---|---|
| 1 | (6, 1) | (2, 5) | (3, 4) |
| 2 | (6, 2) | (3, 1) | (4, 5) |
| 3 | (6, 3) | (4, 2) | (5, 1) |
| 4 | (6, 4) | (5, 3) | (1, 2) |
| 5 | (6, 5) | (1, 4) | (2, 3) |

As a result, the scheduling table is identical to the groups defined above.

For illustration, using graph 500 with six variables and assuming T=2 such that k=3, the $N_b$ (2*3−1=5) sets of variable pairs are

| Set iteration Number | Thread 1 | Thread 2 |
|---|---|---|
| 1 | (6, 1) | (2, 5) |
| 2 | (3, 4) | (6, 2) |
| 3 | (3, 1) | (4, 5) |
| 4 | (6, 3) | (4, 2) |
| 5 | (5, 1) | (6, 4) |
| 6 | (5, 3) | (1, 2) |
| 7 | (6, 5) | (1, 4) |
| 8 | (2, 3) | |

As a result, the scheduling table includes the pairs of variables in the reading order, but distributed across two threads instead of three resulting in additional iterations. The scheduling table defines the pair assigned to each processing thread. After all of the threads complete processing, the next row of the scheduling table is use to assign the pair to a thread.

When an oblique rotation is the operation being performed, an orthogonal rotation for all of the ordered pairs of variables is performed. The scheduling table repeats the same sets of variable pairs except the indices in each pair are reversed such that (y,z) becomes (z,y). After each group of oblique rotations is performed, a factor covariance matrix is updated.

The scheduling table defines the set of variable pairs to be assigned to each thread each iteration.

Referring again to FIG. 2, in an operation 216, a next iteration is set to the first iteration.

In an operation 218, a next set of variable pairs is selected for the next iteration from the scheduling table.

In an operation 220, each pair of the selected next set of variable pairs is assigned to a single thread of the number of threads $T_B$ used to process each iteration. For example, a command may be created and sent to each thread that indicates the optimization function, assigned pair of variables, any predefined parameters needed by the optimization function to execute, etc.

Figure 3:
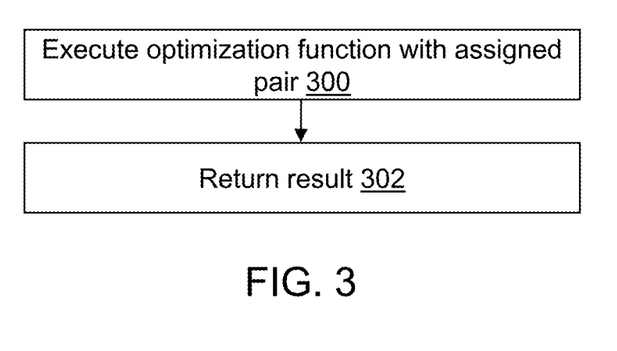
FIG. 3 depicts a flow diagram illustrating examples of operations performed by a thread of the optimization device of FIG. 1 in accordance with an illustrative embodiment.

Referring to FIG. 3, example operations associated with optimization program 122 that are performed by a thread are described.

In an operation 300, the optimization function is executed with the assigned pair of variables. For example, the column values of each observation vector of the plurality of observation vectors stored in input dataset 124 that are associated with the assigned pair of variables are read from input dataset 124 and the optimization function is performed using the read values.

In an operation 302, results of the execution of the optimization function may be returned to the calling thread. Alternatively, the results may be stored in a predefined location known by the calling thread.

In operation 222, the results are received from each of the threads.

In operation 224, combined results are updated with the results received from each of the threads.

Referring again to FIG. 2, in an operation 226, a determination is made concerning whether there is another iteration of the scheduling table to process. When there is another iteration of the scheduling table to process, processing continues in operation 218. When there is not another iteration of the scheduling table to process, processing continues in an operation 228.

In operation 228, a determination is made concerning whether a solution to the optimization function has converged. For example, the optimization criterion value(s) are compared to current values to determine whether a solution to the optimization function has converged. When the solution to the optimization function has converged, processing continues in an operation 230. When solution to the optimization function has not converged, processing continues in operation 216.

In operation 230, output values generated as a result of execution of the optimization function are output. For example, the output values may be output to non-transitory computer-readable medium 108. The output values further may be output through output interface 104 to display 116, speaker 118, or printer 120. The output values further may be output or streamed through communication interface 106 to a non-transitory computer-readable medium, a display, a speaker, or a printer of a computing device of distributed computing system 126 or in a response to a request from a computing device of distributed computing system 126.

Figure 6:
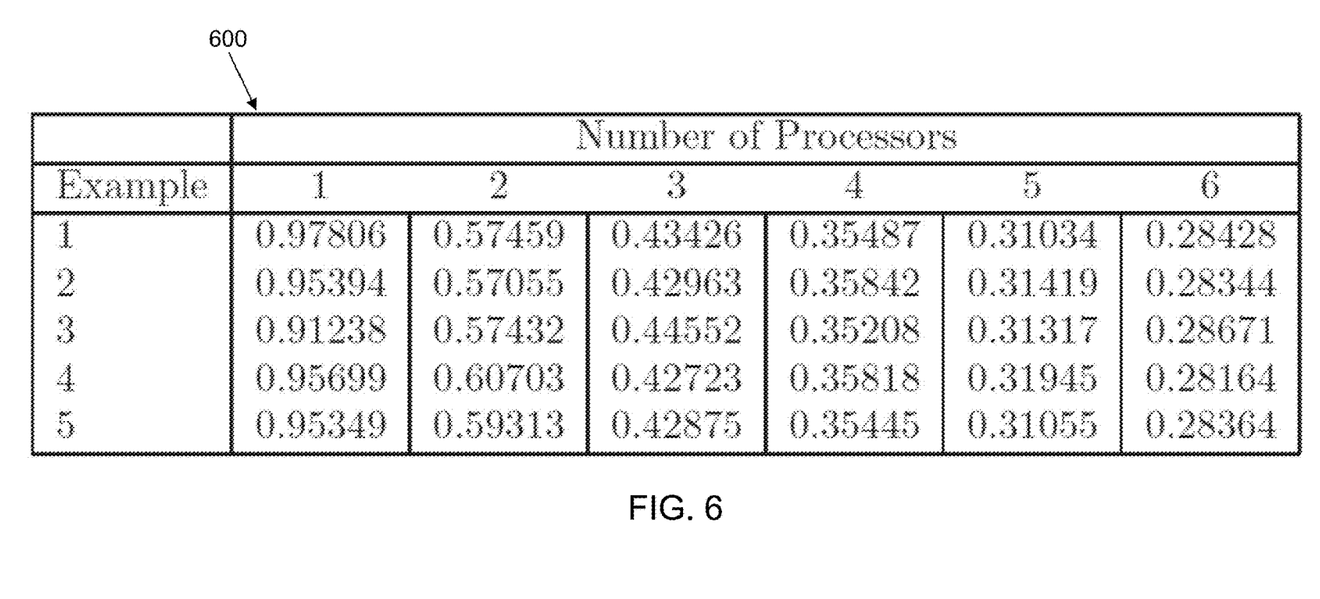
FIG. 6 shows a performance improvement that results from use of optimization device of FIG. 1 in accordance with an illustrative embodiment.

Referring to FIG. 6, a results table 600 shows a performance improvement that results from use of optimization program 122. Five randomly generated loading matrices (examples 1 through 5) consisting of 5000 variables and 100 factors were rotated using a varimax rotation criterion. For reference, the paper titled *Quartic Rotation Criteria and Algorithms*, by Douglas B. Clarkson and Robert I. Jennrich, PSYCHOMETRIKA, Vol. 53, No. 2, pp. 251-259 (June 1988) describes rotation using the varimax rotation criterion. The results in results table 600 show an average clock time in seconds required to complete one cycle (set of iterations in operations 218 to 224) of the optimization procedure. As more processing threads $T_B$(processors) are used, the computational time decreases. A sublinear decrease (relative to an expected theoretical linear performance improvement) is a result of multiple processors competing for the same shared cache memory. The extent that such 'thrashing' degrades performance is system- and problem-specific. Nevertheless, an approximately linear decrease in execution time results with each additional processor. The scheduling table allows the use of multiple threads because it assigns pairs of variables in a manner that avoids resource conflicts that otherwise preclude use of multiple threads, which is the reason that existing methods do not use multiple threads and cannot achieve the performance improvements. Again, to take advantage of parallel computations, careful coordination of the planar rotation subtasks is required to avoid data and resource conflicts. Optimization program 122 provides an efficient parallel algorithm for planar factor rotation and oblique rotation, which allows multithreaded or parallel computation to improve performance. Though always important, improving performance is particularly important in machine learning and artificial intelligence where performance is critical (edge analytics, event stream processing, online learning, etc.). As a result, optimization program 122 solves a technical networked computing problem.

Use of the scheduling table of optimization program 122 avoids resource conflicts exclusively through scheduling rather than through mutex locks, semaphores, etc. In avoiding such elements, optimization program 122 uses fewer resources than alternative approaches and is thus more memory- and performance-efficient. Optimization program 122 provides a guarantee that, to the greatest degree possible, every processor is engaged (as long as there is work remaining to be done) and that these processors never conflict with one another. This is necessarily faster than a naïve approach where a processor may idle, or a conflict may occur.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
- define a group size as a number of factor variables divided by two, wherein the number of factor variables is increased by one when the number of factor variables is an odd number;
- assign a set of variable pairs to each group of a plurality of groups to define a full set of variable pairs comprised of the set of variable pairs assigned to each group of the plurality of groups, wherein the defined group size defines a number of variable pairs included in each set of variable pairs of the full set of variable pairs, wherein each unique pair of unordered factor variables is assigned to only one set of variable pairs of the full set of variable pairs, wherein each set of variable pairs includes each factor variable once, wherein each set of variable pairs defines a 1-factor of a complete undirected graph for the associated group, wherein each factor variable is associated with a node of the complete undirected graph;
- create a scheduling table with a column associated with a thread of a plurality of threads, wherein a number of threads of the plurality of threads is less than or equal to the defined group size, wherein each cell of the scheduling table includes a variable pair, wherein the variable pair is assigned to a respective cell of the scheduling table by consecutive selection from the full set of variable pairs;
- (a) select a first row from the created scheduling table;
- (b) assign each variable pair included in the selected first row to the associated thread of the plurality of threads, wherein each thread executes a predefined optimization function using a respective assigned variable pair;
- (c) receive optimization function results from each thread of the plurality of threads, wherein the optimization function results are output from the predefined optimization function executed by a respective thread;
- (d) update combined optimization function results with the optimization function results received from each thread of the plurality of threads;
- (e) repeat (a) to (d) with each remaining row of the created scheduling table as the first row;
- repeat (a) to (e) until the combined optimization function results satisfy a convergence criterion; and
- output the combined optimization function results.

2. The non-transitory computer-readable medium of claim 1, wherein a first set of variable pairs for a first group is selected using $(2k, 1)_1, (2, 2k-1)_2, (3, 2k-2)_3, \ldots, (k, k+1)_k$, where k is the group size, where each ( ) indicates a variable pair (y,z) with y being a first index to a first variable and z being a second index to a second variable of the factor variables.

3. The non-transitory computer-readable medium of claim 2, wherein a next set of variable pairs for a next group is selected by replacing 2k−1 with zero and adding one to each index of a previous set of variable pairs except for the index equal to 2k, wherein the index equal to 2k is not changed.

4. The non-transitory computer-readable medium of claim 1, wherein before creating the scheduling table, when the number of factor variables is the odd number, each variable pair from the full set of variable pairs that includes an index equal to the group size is removed from the full set of variable pairs.

5. The non-transitory computer-readable medium of claim 1, wherein the predefined optimization function includes an oblique rotation.

6. The non-transitory computer-readable medium of claim 5, wherein after assigning the set of variable pairs and before creating the scheduling table, the full set of variable pairs is updated to include each variable pair in order with a position of each index reversed.

7. The non-transitory computer-readable medium of claim 6, wherein before creating the scheduling table, when the number of factor variables is the odd number, each variable pair from the full set of variable pairs that includes an index equal to the group size is removed from the full set of variable pairs.

8. The non-transitory computer-readable medium of claim 1, wherein the predefined optimization function includes an orthogonal rotation.

9. The non-transitory computer-readable medium of claim 1, wherein the predefined optimization function is a factor analysis.

10. The non-transitory computer-readable medium of claim 1, wherein the predefined optimization function is a principal component analysis.

11. The non-transitory computer-readable medium of claim 1, wherein the variable pair is assigned by consecutive selection from the full set of variable pairs from a first variable pair to a last variable pair of each set of variable pairs of each group of the plurality of groups to.

12. A computing device comprising:
- a processor; and
- a non-transitory computer-readable medium operably coupled to the processor, the computer-readable medium having computer-readable instructions stored thereon that, when executed by the processor, cause the computing device to
  - define a group size as a number of factor variables divided by two, wherein the number of factor variables is increased by one when the number of factor variables is an odd number;
  - assign a set of variable pairs to each group of a plurality of groups to define a full set of variable pairs comprised of the set of variable pairs assigned to each group of the plurality of groups, wherein the defined group size defines a number of variable pairs included in each set of variable pairs of the full set of variable pairs, wherein each unique pair of unordered factor variables is assigned to only one set of variable pairs of the full set of variable pairs, wherein each set of variable pairs includes each factor variable once,
- wherein each set of variable pairs defines a 1-factor of a complete undirected graph for the associated group, wherein each factor variable is associated with a node of the complete undirected graph;
  - create a scheduling table with a column associated with a thread of a plurality of threads, wherein a number of threads of the plurality of threads is less than or equal to the defined group size, wherein each cell of the scheduling table includes a variable pair, wherein the variable pair is assigned to a respective cell of the scheduling table by consecutive selection from the full set of variable pairs;
  - (a) select a first row from the created scheduling table;
  - (b) assign each variable pair included in the selected first row to the associated thread of the plurality of threads, wherein each thread executes a predefined optimization function using a respective assigned variable pair;
(c) receive optimization function results from each thread of the plurality of threads, wherein the optimization function results are output from the predefined optimization function executed by a respective thread;
(d) update combined optimization function results with the optimization function results received from each thread of the plurality of threads;
(e) repeat (a) to (d) with each remaining row of the created scheduling table as the first row;
repeat (a) to (e) until the combined optimization function results satisfy a convergence criterion; and
output the combined optimization function results.

13. The computing device of claim 12, wherein a first set of variable pairs for a first group is selected using $(2k, 1)_1$, $(2, 2k-1)_2$, $(3, 2k-2)_3$, ..., $(k, k+1)_k$, where k is the group size, where each ( ) indicates a variable pair (y,z) with y being a first index to a first variable and z being a second index to a second variable of the factor variables.

14. The computing device of claim 13, wherein a next set of variable pairs for a next group is selected by replacing 2k−1 with zero and adding one to each index of a previous set of variable pairs except for the index equal to 2k, wherein the index equal to 2k is not changed.

15. The computing device of claim 12, wherein before creating the scheduling table, when the number of factor variables is the odd number, each variable pair from the full set of variable pairs that includes an index equal to the group size is removed from the full set of variable pairs.

16. The computing device of claim 12, wherein the predefined optimization function includes an oblique rotation or an orthogonal rotation.

17. The computing device of claim 16, wherein the predefined optimization function includes the oblique rotation, wherein, after assigning the set of variable pairs and before creating the scheduling table, the full set of variable pairs is updated to include each variable pair in order with a position of each index reversed.

18. The computing device of claim 17, wherein before creating the scheduling table, when the number of factor variables is the odd number, each variable pair from the full set of variable pairs that includes an index equal to the group size is removed from the full set of variable pairs.

19. The computing device of claim 12, wherein the variable pair is assigned by consecutive selection from the full set of variable pairs from a first variable pair to a last variable pair of each set of variable pairs of each group of the plurality of groups.

20. A method of scheduling and processing a plurality of optimization tasks in parallel, the method comprising:
defining, by a computing device, a group size as a number of factor variables divided by two, wherein the number of factor variables is increased by one when the number of factor variables is an odd number;
assigning, by the computing device, a set of variable pairs to each group of a plurality of groups to define a full set of variable pairs comprised of the set of variable pairs assigned to each group of the plurality of groups, wherein the defined group size defines a number of variable pairs included in each set of variable pairs of the full set of variable pairs, wherein each unique pair of unordered factor variables is assigned to only one set of variable pairs of the full set of variable pairs, wherein each set of variable pairs includes each factor variable once, wherein each set of variable pairs defines a 1-factor of a complete undirected graph for the associated group, wherein each factor variable is associated with a node of the complete undirected graph;
creating, by the computing device, a scheduling table with a column associated with a thread of a plurality of threads, wherein a number of threads of the plurality of threads is less than or equal to the defined group size, wherein each cell of the scheduling table includes a variable pair, wherein the variable pair is assigned to a respective cell of the scheduling table by consecutive selection from the full set of variable pairs;
(a) selecting, by the computing device, a first row from the created scheduling table;
(b) assigning, by the computing device, each variable pair included in the selected first row to the associated thread of the plurality of threads, wherein each thread executes a predefined optimization function using a respective assigned variable pair;
(c) receiving, by the computing device, optimization function results from each thread of the plurality of threads, wherein the optimization function results are output from the predefined optimization function executed by a respective thread;
(d) updating, by the computing device, combined optimization function results with the optimization function results received from each thread of the plurality of threads;
(e) repeating, by the computing device, (a) to (d) with each remaining row of the created scheduling table as the first row;
repeating, by the computing device, (a) to (e) until the combined optimization function results satisfy a convergence criterion; and
outputting, by the computing device, the combined optimization function results.

21. The method of claim 20, wherein a first set of variable pairs for a first group is selected using $(2k, 1)_1$, $(2, 2k-1)_2$, $(3, 2k-2)_3$, ..., $(k, k+1)_k$, where k is the group size, where each ( ) indicates a variable pair (y,z) with y being a first index to a first variable and z being a second index to a second variable of the factor variables.

22. The method of claim 21, wherein a next set of variable pairs for a next group is selected by replacing 2k−1 with zero and adding one to each index of a previous set of variable pairs except for the index equal to 2k, wherein the index equal to 2k is not changed.

23. The method of claim 20, wherein before creating the scheduling table, when the number of factor variables is the odd number, each variable pair from the full set of variable pairs that includes an index equal to the group size is removed from the full set of variable pairs.

24. The method of claim 20, wherein the predefined optimization function includes an oblique rotation.

25. The method of claim 24, wherein after assigning the set of variable pairs and before creating the scheduling table, the full set of variable pairs is updated to include each variable pair in order with a position of each index reversed.

26. The method of claim 25, wherein before creating the scheduling table, when the number of factor variables is the odd number, each variable pair from the full set of variable pairs that includes an index equal to the group size is removed from the full set of variable pairs.

27. The method of claim 20, wherein the predefined optimization function includes an orthogonal rotation.

28. The method of claim 20, wherein the predefined optimization function is a factor analysis.

29. The method of claim 20, wherein the predefined optimization function is a principal component analysis.

30. The method of claim 20, wherein the variable pair is assigned by consecutive selection from the full set of variable pairs from a first variable pair to a last variable pair of each set of variable pairs of each group of the plurality of groups.

* * * * *

UNITED STATES PATENT AND TRADEMARK OFFICE
CERTIFICATE OF CORRECTION

PATENT NO. : 10,289,447 B1
APPLICATION NO. : 16/221752
DATED : May 14, 2019
INVENTOR(S) : William Clayton Thompson et al.

Page 1 of 1

It is certified that error appears in the above-identified patent and that said Letters Patent is hereby corrected as shown below:

In the Specification

<u>Column 6, Line 29</u>:
Delete the phrase "The SASS Viya™" and replace with --The SAS® Viya™--.

<u>Column 9, Line 23</u>:
Delete the phrase "variables indicated as "1", "2", "3", "5", and "6"." and replace with --variables indicated as "1", "2", "3", "4", "5", and "6".--.

In the Claims

<u>Claim 11, Column 14, Line 29</u>:
Delete the phrase "groups to." and replace with --groups.--.

Signed and Sealed this
Seventeenth Day of September, 2019

Andrei Iancu
*Director of the United States Patent and Trademark Office*